Nov. 30, 1948.  E. MORF  2,455,081
SHOCK ABSORBING BEARING
Filed Sept. 10, 1943  2 Sheets-Sheet 1

Inventor
E. Morf
By Glascock Downing & Seebold Attys

Nov. 30, 1948.    E. MORF    2,455,081
SHOCK ABSORBING BEARING
Filed Sept. 10, 1943    2 Sheets-Sheet 2
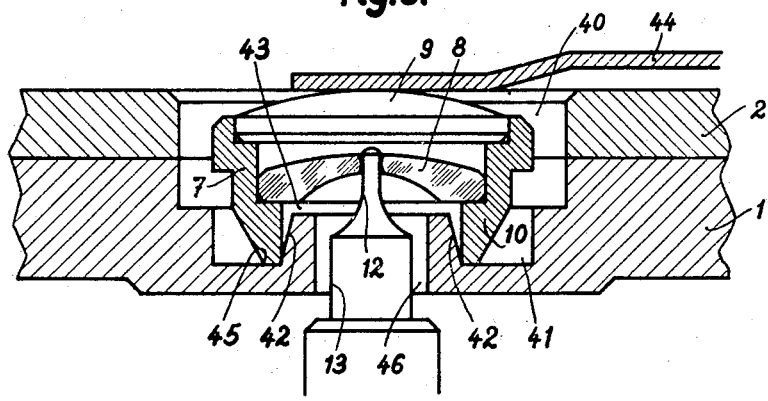
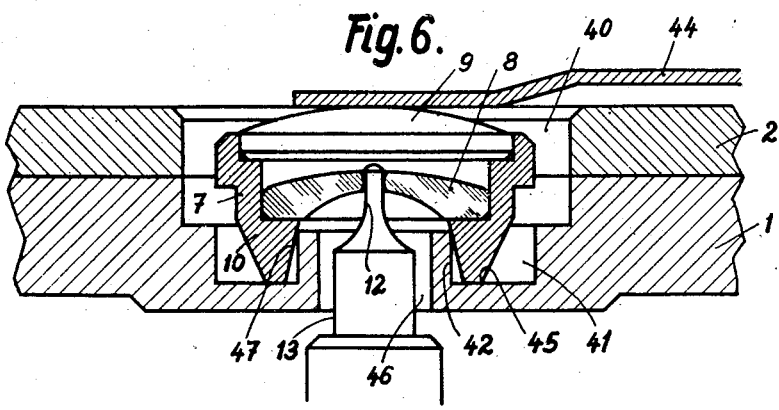
Inventor
E. Morf
By Glascock Downing Seebold
Attys Patented Nov. 30, 1948

2,455,081

UNITED STATES PATENT OFFICE 2,455,081

SHOCK ABSORBING BEARING

Ernest Morf, La Chaux-de-Fonds, Switzerland

Application September 10, 1943, Serial No. 501,871
In Switzerland January 11, 1943

1 Claim. (Cl. 58—140)

Object of the present invention is a shock absorbing bearing, particularly for watches, which is characterised in that the bearing piece is mounted on a member having an extension and being capable of tilting under the effect of a shock. The whole is brought back into normal position by a spring.

The accompanying drawings illustrate, by way of examples, different embodiments of the object of the invention.

Figure 1:
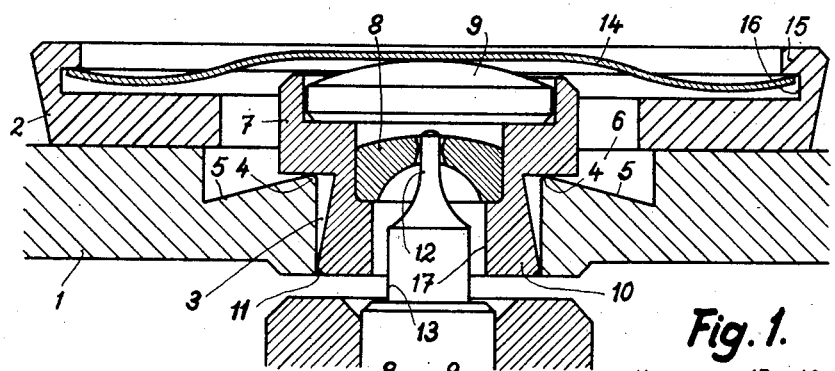
Figure 2:
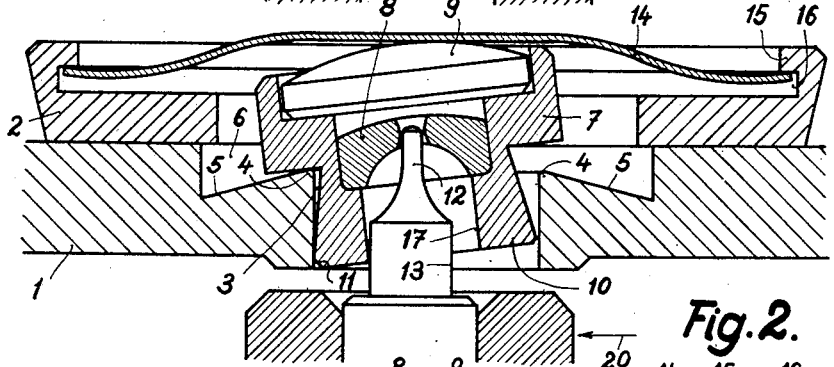
Figure 3:
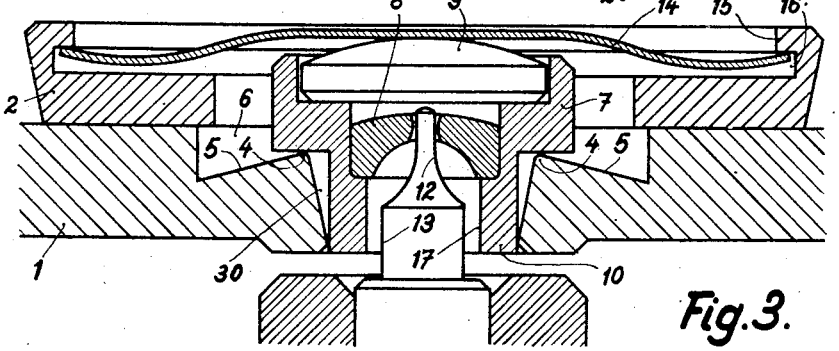
Figure 4:
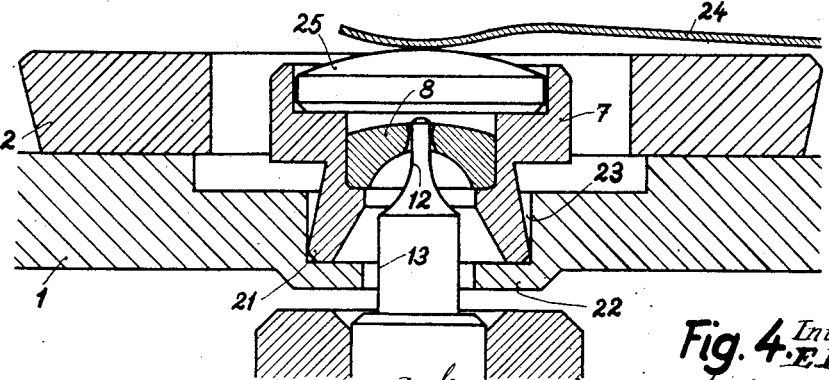

Figs. 1 and 2 show an axial section through a first example, with certain parts in different positions, Fig. 3 shows a modification of a detail of Figs. 1 and 2, Fig. 4 is an axial section through a second, Fig. 5 through a third embodiment and Fig. 6 shows a modification of a detail of Fig. 5.

In Figs. 1 and 2 the coverplate 2 is held in any suitable manner on the flat part of the cock 1. This flat part is provided with a cylindric hole 3 having on its upper end an edge 4 forming the intersection line of the envelope of the hole 3 and a conical surface 5 forming the bottom of a sinking 6 on the top of the flat part of the cock 1. On this edge 4 a member 7 is supported in which the bearing piece (pierced jewel) 8 and the cap jewel 9 are set. The member 7 has a conical extension 10, the base of the cone slidably fitting the cylindrical hole 3 while the extension ends in a chamfered edge 11. Therefore, the base of the cone does not correspond with the end of the extension 10 and, in rest position, the member 7 is always centered in the interior of the hole 3. This position is also that of perfect centration of the pivot 12 entering the pierced jewel 8 while the part 13 of the shaft of the movable part enters a bore 17 of the extension 10 of the member 7.

A plate spring 14 engaging the flange 15 forming the upper border of the circular groove 16 exerts an axial pressure upon the system: cap jewel 9, member 7, pierced jewel 8, in order to press it against the edge 4. This ensemble, forming a simple and robust whole, can easily be manufactured with the exactness required in watches of high quality. Oil can be inserted at any moment without any danger for the recentration of the different parts.

The operation of the shock absorbing bearing in the event of a blow exerted on the watch in the direction of the arrow 20 is illustrated in Fig. 2. Under the pressure of the pivot 12, which is transmitted by the pierced jewel 8 to the member 7, the latter tilts about the edge 4 until the part 13 of the shaft of the movable part is in contact with the wall of the bore 17. The dimensions of the part 13 are sufficient to prevent any damage of the pivot caused by the inertia stored in the movable part. During this tilting the spring 14 is tensioned and, as soon as the shock is absorbed, this spring brings the whole back into the normal position shown in Fig. 1, for it is impossible for the tilting system to remain in the position into which it was brought by the shock.

It is understood that all surfaces and edges co-operating during tilting are, whatever the direction of the shock may be, protected against oil and cannot adhere to one another.

In Fig. 3 the same parts are seen as in Figs. 1 and 2 with the single difference that the extension 10 of the member 7 is cylindrical and enters a conical hole 30 of the flat part of the cock 1.

In the embodiment shown in Fig. 4 the tilting system: cap jewel 25, pierced jewel 8, member 7 bears by the extension 21 of the member 7 against the pierced bottom 22 of a sinking 23 in the interior of which the said extension is exactly centered. The spring 24 is fixed to the cock and the cap jewel 25 is not forced into the member 7.

When, under the effect of a shock, the tilting system leaves the normal position represented in Fig. 4 it is inclined in one or another direction while oscillating about the foot of the extension 21 until the part 13 of the shaft of the movable part is in contact with the wall of the hole of the bottom 22.

All described tilting movements are the effect of shocks directed substantially perpendicularly to the axis of the movable part. In the event of shocks parallel to the said axis the pivot bears against the cap jewel and if this latter is forced into the member 7 the whole tilting system is displaced against the effect of the spring 24. If the cap jewel is loosely placed on the member 7 as is the case in Fig. 4, this cap jewel only is displaced.

Into the flat part of the cock 1 and the cover plate 2 in Fig. 5 a cavity 40 is practised whose bottom is formed by a groove 41 the outer wall of which is cylindrical, the inner wall 42, however, conical. The diameter of the base of this cone corresponds to that of the bore 43 of the extension 10 of the member 7 carrying the pierced jewel 8 and the cap jewel 9. Here, too, the whole is held in place by the spring 44 pressing the extension 10 of the member 7 against the bottom of the groove 41.

Under the effect of a shock, the pivot 12 entering the pierced jewel 8 acts by means of this latter upon the member tilting about its outer edge 45 until the part 13 of the shaft of the movable part bears against the wall of the hole 46 provided on the cock 1. When the shock is over, the pressure of the spring 44 and the cooperation of the wall of the bore 43 with the conical surface 42 of the groove brings the whole back into the position shown in Fig. 5.

In Fig. 6 the same parts are to be found as in Fig. 5 with the single difference that the wall 42 of the groove 41 is cylindrical, while the bore 47 of the extension 10 of the member 7 is conical. The wall of this bore cooperates with the upper edge of the inner wall 42 for recentering the member 7 and the parts carried on it when, under the effect of a shock, the member 7 has tilted about its edge 45.

All the embodiments shown relate to watches but it is understood that the same elements might be used in apparatus of other types and greater size.

What I claim is:

In combination, a spindle with a pivot and a portion extending from said pivot, a bearing piece supporting said pivot in radial direction, a plate having a cylindrical hole, a member supported on an edge of said cylindrical hole, said member having a seat for said bearing piece and an extension with conical envelope extending from said seat towards and into reach of said portion and into said cylindrical hole, the great base of said conical envelope making contact with the wall of said cylindrical hole, the space remaining between the wall of said cylindrical hole and said conical envelope allowing said member to tilt about a point of contact of the great base of said conical envelope with the wall of the cylindrical hole and to slide on said edge of the wall of said cylindrical hole on the occasion of a radial shock exerted on said spindle, and a spring in cooperating relation with said member for bringing the latter back into normal position.

ERNEST MORF.

REFERENCES CITED

The following references are of record in the file of this patent:

UNITED STATES PATENTS

| Number | Name | Date |
|---|---|---|
| 2,219,068 | Colomb | Oct. 22, 1940 |
| 2,239,682 | Marti | Apr. 29, 1941 |